United States Patent
Vera

(10) Patent No.: US 12,546,637 B2
(45) Date of Patent: Feb. 10, 2026

(54) FLUID CONDUCTIVITY SENSOR BASED ON MAGNETO-INDUCTIVE POWER TRANSFER DISSIPATION

(71) Applicant: ARAMCO SERVICES COMPANY, Houston, TX (US)

(72) Inventor: Alejandro Vera, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 322 days.

(21) Appl. No.: 18/475,313

(22) Filed: Sep. 27, 2023

(65) Prior Publication Data

US 2025/0102338 A1   Mar. 27, 2025

(51) Int. Cl.
| | |
|---|---|
| *G01F 1/74* | (2006.01) |
| *G01R 33/343* | (2006.01) |
| *G01N 33/28* | (2006.01) |

(52) U.S. Cl.
CPC ............ *G01F 1/74* (2013.01); *G01R 33/343* (2013.01); *G01N 33/2847* (2013.01)

(58) Field of Classification Search
CPC ......... G01R 33/343; H01P 7/00; H01P 7/005; H01P 7/06; G01F 1/74; G01F 33/2847
See application file for complete search history.

(56) References Cited

U.S. PATENT DOCUMENTS

| | | | |
|---|---|---|---|
| 4,504,788 A * | 3/1985 | Froncisz | H01P 7/06 334/45 |
| 6,782,736 B1 | 8/2004 | Hammer | |
| 7,276,916 B2 | 10/2007 | Hammer | |

(Continued)

FOREIGN PATENT DOCUMENTS

| | | |
|---|---|---|
| CN | 105008916 A | 10/2015 |
| GB | 2571285 A | 8/2019 |

(Continued)

OTHER PUBLICATIONS

International Search Report issued in corresponding International Application No. PCT/US2024/047979; mailed Dec. 19, 2024 (5 pages).

(Continued)

*Primary Examiner* — Justin N Olamit
(74) *Attorney, Agent, or Firm* — Osha Bergman Watanabe & Burton LLP

(57) ABSTRACT

A fluid conductivity sensor (FCS) system for determining a water void fraction in a fluid mixture flows comprises a duct containing the fluid mixture flows; a dielectric window system operatively connected to the duct, wherein the dielectric window system comprises a first dielectric window built-into a first surface of a wall of the duct and a second dielectric window built-into a second surface of the wall aligned and opposite to the first surface; a split-toroidal loop-gap resonator (split-TLGR) system operatively connected to the dielectric window system and the duct, wherein the split-TLGR system comprises a first split-TLGR built-into the first dielectric window and a second split-TLGR built-into the second dielectric window; and a vector network analyzer (VNA) operatively connected to the split-TLGR system and configured to measure the fluid conductivity, wherein the water void fraction is derived from the fluid conductivity.

20 Claims, 8 Drawing Sheets

(56) References Cited

U.S. PATENT DOCUMENTS

| | | |
|---|---|---|
| 9,562,864 B2 * | 2/2017 | Harrison .................. H01P 7/06 |
| 10,386,312 B2 * | 8/2019 | Karimi ................... G01N 22/04 |
| 10,591,441 B2 * | 3/2020 | Winecki ............ G01N 33/1833 |
| 10,648,841 B1 | 5/2020 | Arsalan et al. |
| 10,684,236 B2 * | 6/2020 | Hurlimann ............ G01N 22/00 |
| 2003/0151408 A1 | 8/2003 | Kruspe et al. |
| 2016/0334343 A1 | 11/2016 | Hurlimann et al. |
| 2017/0074816 A1 | 3/2017 | Jean et al. |
| 2022/0146419 A1 | 5/2022 | Chen et al. |

FOREIGN PATENT DOCUMENTS

| | | |
|---|---|---|
| WO | 2016060860 A1 | 4/2016 |
| WO | 2022161746 A1 | 8/2022 |

OTHER PUBLICATIONS

Written Opinion of the International Searching Authority issued in corresponding International Application No. PCT/US2024/047979; dated Dec. 19, 2024 (9 pages).

Bobowski and Clements, "Permittivity and Conductivity Measured Using a Novel Toroidal Split-ring Resonator," IEEE Transactions on Microwave Theory and Techniques 65(6): Jan. 16, 2017, pp. 2132-2138, 7 pages.

Rivera-Lavado et al., "Low-cost Electromagnetic Split-ring Resonator Sensor System for the Petroleum Industry," Sensors, 22(9): 3345, Apr. 27, 2022, 14 pages.

\* cited by examiner

FLUID CONDUCTIVITY SENSOR BASED ON MAGNETO-INDUCTIVE POWER TRANSFER DISSIPATION

BACKGROUND

The conventional techniques of determining the water void fraction in the conductive fluid mixture flows using dielectric sensors, conductive sensors, inductive coils, or microwave sensors are limited by their inaccuracies. Currently in multiphase flow meters, the measurements of permittivity and/or gamma absorption are used to determine the water void fraction in the conductive fluid mixture flows. Both measuring methods are influenced by all the components of the mixture simultaneously, which complicates the estimations of the water void fraction in the conductive fluid mixture flows. Accordingly, there is a need for a system and method for measuring the water void fraction in a fluid mixture flows, independent of the amount of the other components in the fluid mixture flows, such as electrically insulating elements (i.e., oil and gas).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a fluid conductivity sensor (FCS) system for determining a water void fraction in a fluid mixture flows. The FCS system comprises a duct containing the fluid mixture flows; a dielectric window system operatively connected to the duct, wherein the dielectric window system comprises a first dielectric window built-into a first surface of a wall of the duct, and a second dielectric window built-into a second surface of the wall aligned and opposite to the first surface; a split-toroidal loop-gap resonator (split-TLGR) system operatively connected to the dielectric window system and the duct, wherein the split-TLGR system comprises a first split-TLGR built-into the first dielectric window and a second split-TLGR built-into the second dielectric window; and a vector network analyzer (VNA) operatively connected to the split-TLGR system and configured to measure the fluid conductivity, wherein the water void fraction is derived from the fluid conductivity.

In general, in one aspect, embodiments disclosed herein relate to a method for determining a water void fraction in a fluid mixture flows. The method comprises filling a duct with the fluid mixture flows; disposing a first dielectric window into a first surface of a wall of the duct; disposing a second dielectric window built-into a second surface of the wall aligned and opposite to the first surface; disposing a first split-TLGR into the first dielectric window; disposing a second split-TLGR into the second dielectric window; connecting a vector network analyzer (VNA) to the first split-TLGR and the second split-TLGR; measuring a fluid conductivity using the VNA; and deriving the water void fraction from the fluid conductivity.

Other aspects and advantages of the claimed subject matter will be apparent from the following description and the appended claims.

DETAILED DESCRIPTION

Figure 1:
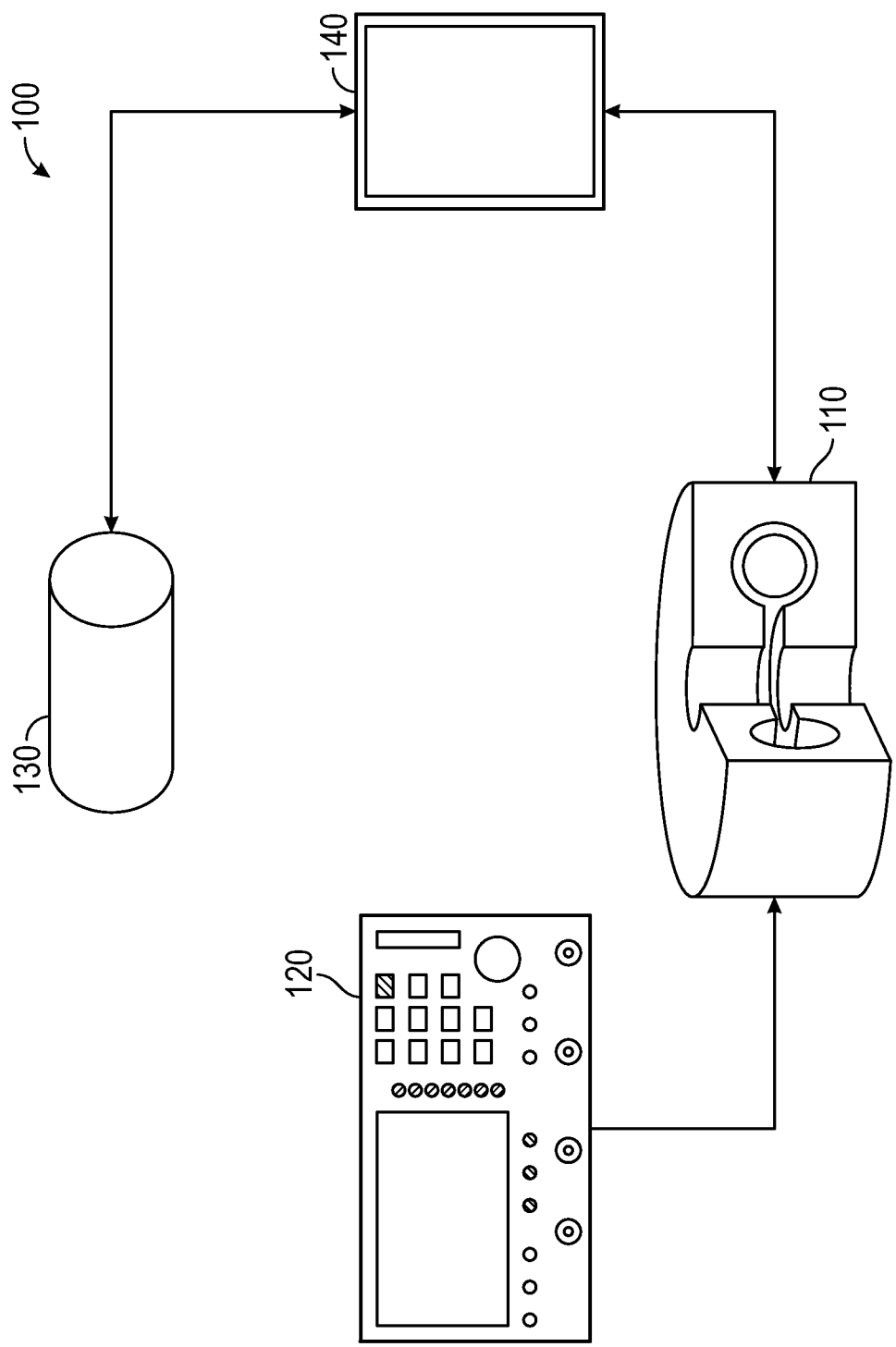
FIG. 1 shows an overview of a fluid conductivity sensor system for determining the water void fraction in a fluid mixture flows in accordance with one or more embodiments of the disclosure.

Specific embodiments of the present disclosure will now be described in detail below with reference to the accompanying drawings. Like elements in the various figures are denoted by like reference numerals for consistency.

In the following detailed description of embodiments of the disclosure, numerous specific details are set forth to provide a more thorough understanding of the invention. However, it will be apparent to a person having ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (e.g., any noun in the application). The use of ordinal numbers is not intended to imply or create a particular ordering of the elements nor to limit any element to being only a single element unless expressly disclosed, such as using the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the disclosure provide a system and method for autonomously deploying geophysical cables for data transmission or sensing underground in the sand dunes characterized with loose sand such as in the remote desert regions or in coastal silt (shallow water) areas. Embodiments of the disclosure provide a fully autonomous system and method for geophysical cables deployment utilizing one or more subsurface burrowing robots. A detailed description is subsequently provided in reference to the figures.

FIG. 1 shows an overview of a fluid conductivity sensor system for determining the water void fraction in a fluid mixture flows in accordance with one or more embodiments of the disclosure. The fluid conductivity sensor (FCS) system 100 comprises a split-toroidal loop-gap resonator (split-TLGR) system 110, a vector network analyzer (VNA) 120, a duct 130, and a dielectric window system 140. Each of these components is subsequently described in detail with reference to FIG. 5.

Figure 2A:
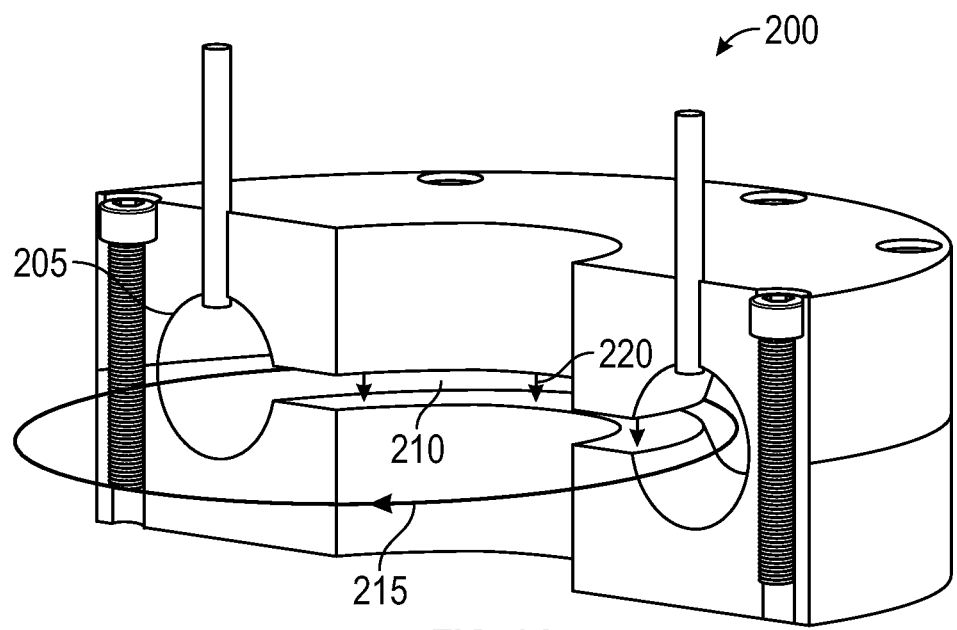
FIG. 2A shows a cutaway view of a toroidal loop-gap resonator (TLGR) and FIG. 2B shows the TLGR cross-section in accordance with one or more embodiments of the disclosure.
Figure 2B:
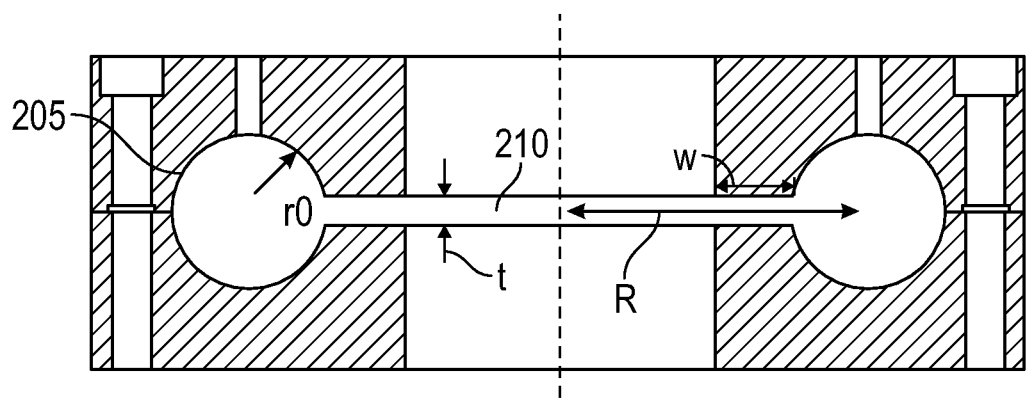

FIG. 2A shows a cutaway view of a toroidal loop-gap resonator (TLGR) and FIG. 2B shows the TLGR cross-section in accordance with one or more embodiments of the disclosure. The TLGR 200 is also known as toroidal magneto-inductive Resonator or toroidal split-ring resonator (TSRS). The TLGR 200 has one resonance frequency and can be used to exchange or transfer energy wirelessly (i.e., inductively) from one split-TLGR (i.e., transmitter) to another identical split-TLGR (i.e., receiver), through air or water, over distances that are several times the largest dimension of the split-TLGRs used as transmitter/receiver. The energy transmission will have power losses depending on the medium conductivity between the two split-TLGRs, which are coupled by the same resonance frequency.

The cutaway view, FIG. 2A, shows the TLGR 200 comprising a bore 205, a narrow gap 210, magnetic field lines 215 completely contained within the bore 205 of the of the TLGR 200, and electric field lines 220 concentrated within the narrow gap 210 of the TLGR 200.

The cross-section, FIG. 2B, shows the dimensions of the TLGR 200 where t is the thickness of the gap 210 of the of the TLGR 200, $r_0$ is the radius of the bore 205 of the of the TLGR 200.

Figure 3B:
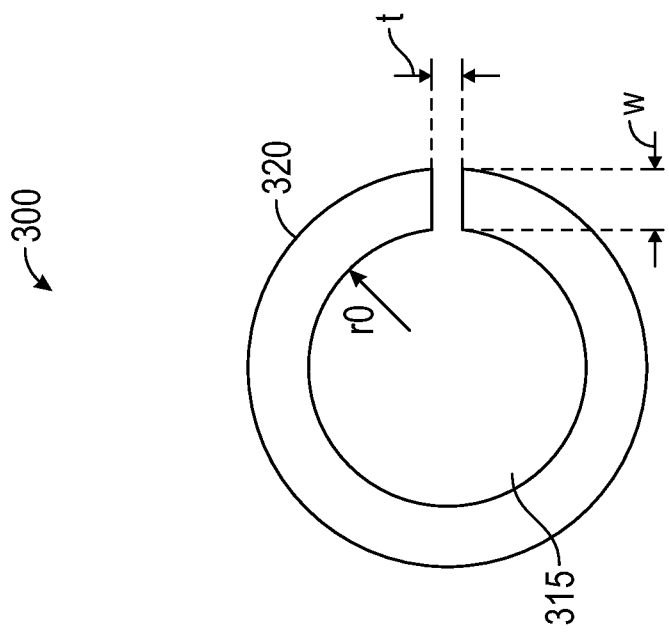
FIG. 3A shows a perspective view of a cylindrical loop-gap resonator (CLGR) and FIG. 3B shows the CLGR cross-section in accordance with one or more embodiments of the disclosure.
Figure 3A:
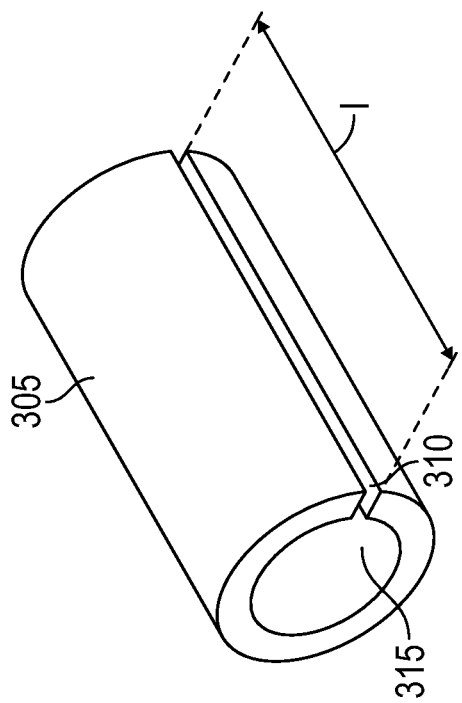

FIG. 3A shows a perspective view of a cylindrical loop-gap resonator (CLGR) and FIG. 3B shows the CLGR cross-section in accordance with one or more embodiments of the disclosure. The CLGR 300 comprises a body 305 having a length (l), a gap 310 (a narrow gap) having a width (w) along the length of the body 305, and a bore 315 with radius ($r_0$). The currents on the inside surface of the bore 315 generate an inductive reactance, while the electric field across the gap 310 generates a capacitive reactance. When the stored magnetic energy in the loop 320 and the stored electric energy in the gap 310 are equal, the CLGR 300 becomes resonant. The physical geometry of the CLGR 300 and the gap 310 can be designed to implement high-Q resonators.

FIG. 3A and FIG. 3B show a typical CLGR 300 where the loop 320 acts as an inductor and the gap 310 is cut along the length of the body 305 to create a capacitor. The capacitance of the CLGR 300 depends on the difference between the inner and outer radii of the body 305, whereas the inductance of the CLGR 300 is a function of the inner radius of the body 305. The resonant frequency can be adjusted by changing the inner radius of the body 305 (inductance) or by increasing the difference between the inner and outer radii of the body 305 (capacitance).

Signals can be inductively coupled into and out of the bore 315 of the CLGR 300 using coupling loops. The coupling loops are single-turn inductors that are made by short-circuiting the center conductor of a coaxial cable to its outer conductor. The coupling strength between the coupling loops and nearby CLGR 300 can be easily tuned by adjusting the distance between the two.

The resonant frequency ($\omega_o$) of the CLGR 300 depends on the inductance and the capacitance. In the CLGR 300, the value of both the inductance (L) and the capacitance (C) are directly dependent on the structural parameters shown in FIGS. 3(a) and 3(b), including the body 305 length (l), the gap width (w), the loop radius (r), the separation between plates (d), and the permittivity in the gap 310. These relationships are governed by the following equations:

$$L = \frac{\mu N^2 \pi r^2}{l} \quad (1)$$

$$C = \epsilon \frac{lw}{d}$$

$$W_0 = \sqrt{\frac{1}{LC}} = \sqrt{\frac{d}{\epsilon \mu \pi N^2 r^2 w}}$$

The CLGR 300 uses a single loop (N=1). The resonant frequency ($\omega_o$) of the CLGR 300 is independent of the length (l) of the body 305. The CLGR 300 can be designed according to application-specific requirements by adjusting its various physical dimensions. The resonant frequency ($\omega_o$) is inversely proportional to the loop radius (r), so a larger loop-hole can lower the resonant frequency ($\omega_o$) resulting in low electronic cost to operate the CLGR 300. The CLGR 300 can be modified by joining its two ends to form a TLGR 200.

Figure 4:
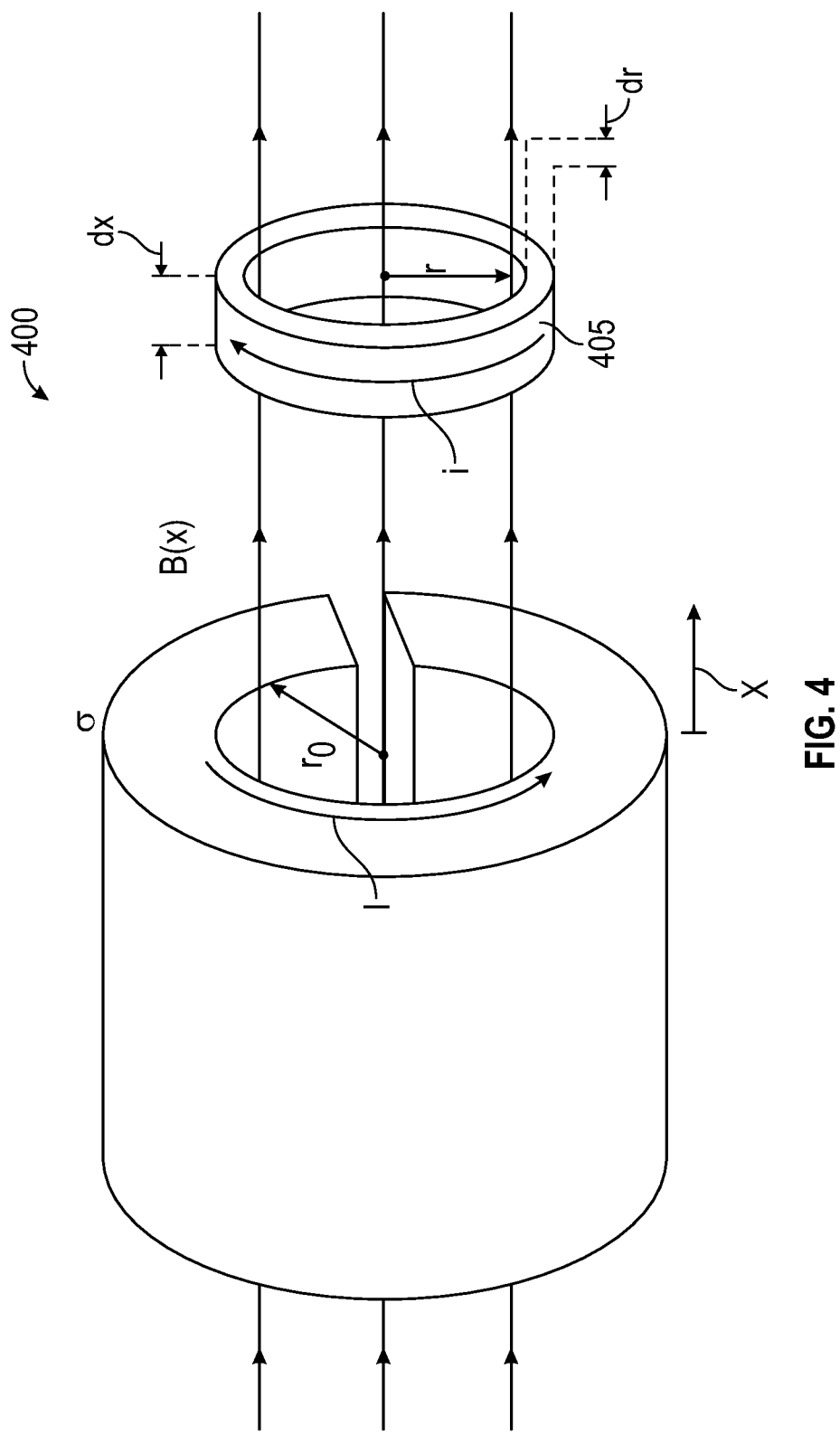
FIG. 4 shows a diagram of a CLGR analysis in accordance with one or more embodiments of the disclosure.

FIG. 4 shows a diagram of a CLGR analysis in accordance with one or more embodiments of the disclosure. Although FIG. 4 shows a CLGR 400, the calculations that follow can be applied to both the CLGR and TLGR geometries.

Assuming an oscillating magnetic field of the form $B(x) = B_0(x)\cos\omega_0 t$, where $\omega_0$ is the resonant frequency of the CLGR 400. In the region between the transmitting and receiving resonators, $B_0$ will initially decrease as it moves away from the transmitting resonator and then increase as it approaches the receiving resonator. The power dissipation is estimated by first finding the induced emf ε around a circular loop 405 of radius r due to the changing magnetic flux. Then, an estimation of the resistance along the path followed by the resulting current is made. Next, the power dissipation associated with each infinitesimal current loop is calculated. Finally, the contributions from all current loops within a plane of width dx are summed.

The magnetic flux Φ through the ring induces a current i which flows along the circumference of the ring and through a cross-sectional area given by drdx. Therefore, the conductance of this infinitesimal ring is δG=σdrdx/(2πr). The induced emf ε is calculated from −dΦ/dt which, in the assumed geometry, is approximately ε≈πr2ω0B0(x)sin ω0t. As a result, the power dissipation associated with the infinitesimal current loop of FIG. 4 is given by:

$$\delta P = \varepsilon^2 \delta G = (\pi/2) r^3 \sigma w_0^2 B_0^2(x) \sin^2 w_0 t \, dr dx \quad (2)$$

The power dissipated by all current loops in a disk of thickness dx is obtained by integrating δP with respect to r from zero to $r_0$, the radial range over which $B_0(x)$ is assumed to be non-zero and constant. Evaluating this integral and taking a time average over one period yields:

$$\langle dP \rangle = \left\langle \int_{r=0}^{r_0} \delta P \right\rangle = (\pi/16) r_0^4 \sigma w_0^2 B_0^2(x) dx \quad (3)$$

Finding the total power dissipated in the space between the transmitting and receiving resonators requires an integration with respect to x and a suitable model for the spatial dependence of $B_0(x)$.

Several insights can be gleaned from (3). First, the magnetic power dissipated by the conductive medium is proportional to the conductivity σ. Second, for a fixed conductivity, the power dissipation can be reduced by decreasing either $\omega_0$ or $r_0$. The magnetic power loss varies by $r_0^4$ which is much more significant than the $\omega_0^2$ dependence. It is best to design the CLGR 400 to be as small as possible and then lower the resonant frequency by filling the gap with a low-loss and high-permittivity dielectric.

Figure 5:
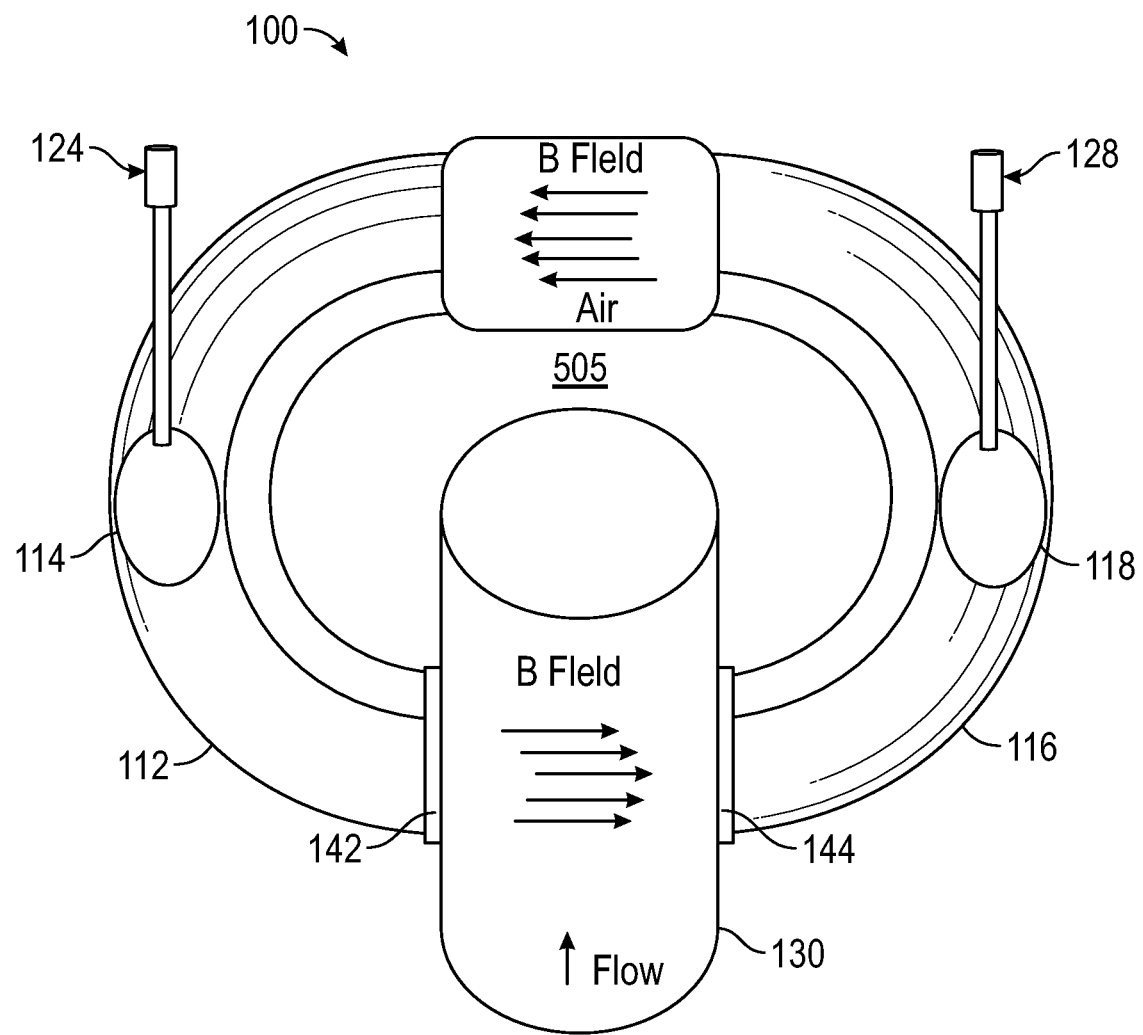
FIG. 5 shows an illustration of the fluid conductivity sensor system for determining the water void fraction in a fluid mixture flows in accordance with one or more embodiments of the disclosure.

FIG. 5 shows an illustration of the fluid conductivity sensor system for determining the water void fraction in a fluid mixture flows in accordance with one or more embodiments of the disclosure. The fluid conductivity sensor (FCS) system 100 comprises a split-toroidal loop-gap resonator (split-TLGR) system 110, a vector network analyzer (VNA) 120, a duct 130, and a dielectric window system 140, as shown in FIG. 1. Each of these components is subsequently described.

The split-TLGR system 110 is operatively connected to the dielectric window system 140 and the duct 130. The split-TLGR system 110 comprises a first split-TLGR 112 (transmitting split-TLGR) built-into a first dielectric window 142 and a second split-TLGR 116 (receiving split-TLGR) built-into a second dielectric window 144. The first split-TLGR 112 and the second split-TLGR 116 are structurally identical. A distal end of the first split-TLGR 112 from the first dielectric window 142 and a distal end of the second split-TLGR 116 from the second dielectric window 144 are joined to form a TLGR. The TLGR comprises a narrow gap 505 filled with a dielectric material, a first coupling loop 114 (transmitting coupling loop) located in the first split-TLGR 112, a second coupling loop 118 (receiving coupling loop) located in the second split-TLGR 116, and an oscillating magnetic field transmitted by the first coupling loop 114, transited through the duct 130 via the first dielectric window 142 and the second dielectric window 144, and received by the second coupling loop 118 to form a magnetic loop.

The VNA 120 is operatively connected to the split-TLGR system 110. The VNA 120 is configured to measure the fluid conductivity of fluid mixture flows. The water void fraction is derived from the measured fluid conductivity. The VNA 120 comprises a first port 124 connected to the first coupling loop 114 and a second port 128 connected to the second coupling loop 118. The VNA 120 is configured to drive the first coupling loop 114, via the first port 124, to operate at a specific frequency at which the TLGR resonates. The VNA 120 is also configured to measure, via the second port 128, a signal amplitude related to the conductivity of the fluid mixture flows and transfer the signal amplitude to a digital device for storage and analysis. If the split-TLGRs have only one resonance frequency, then the water conductivity must be known to determine the water void fraction. If the split-TLGRs are modified to generate a second resonance frequency, then the water conductivity can be measured too. In an oil/water/gas mixture the inductive power loss will be dependent on the water content, but not on the gas and oil content in the mixture, as these two components are not electrically conductive.

The fraction of electrically conductive fluid components in the fluid mixture determines the strength of the induced magnetic field, and thereby the power dissipation induced which is reflected in the signal read by the receiving coupling loop.

The $IS_{21}I$ signal magnitude will depend on the conductivity of the fluid mixture. The mixture conductivity is related to the water void fraction through the following expression:

$$\delta_{mix} = \sigma_{liq} \cdot (1 - GVF)^{\frac{3}{2}} \tag{4}$$

$$\sigma_{liq} = \sigma_w \cdot WLR^{\frac{3}{2}}$$

$$WVF = WLR \cdot (1 - GVF)$$

The duct 130 contains fluid mixture flows. The fluid mixture flows contained in the duct 130 will be either a multiphase flow, drilling mud, or any other conductive media. The oscillating magnetic field can go through the flowing media by passing through the dielectric window system 140 built-into the walls of the duct 130. The interaction of the flowing media with the oscillating magnetic field will cause a power loss that is a function of the conductivity of the medium. The power loss will be measured and used to calculate water void fraction.

The dielectric window system 140 is operatively connected to the duct 130. The dielectric window system 140 comprises a first dielectric window 142 built-into a first surface of the wall of the duct 130 and a second dielectric window 144 built-into a second surface of the wall of the duct 130 aligned and opposite to the first surface. The first dielectric window 142 and the second dielectric window 144 are structurally identical.

Figure 6:
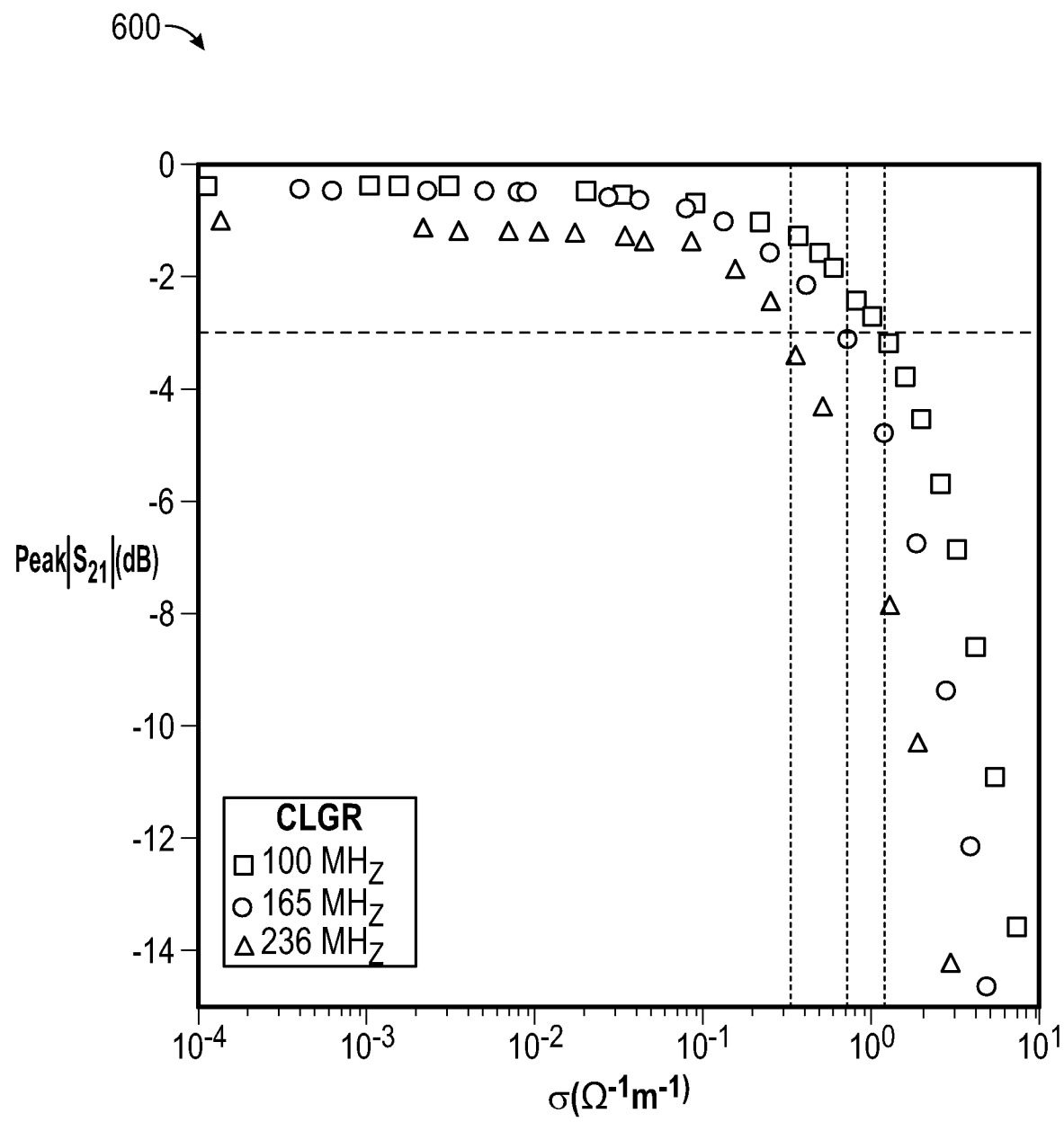
FIG. 6 shows calibration curves of the fluid conductivity sensor system for determining the water void fraction in a fluid mixture flows in accordance with one or more embodiments of the disclosure.

FIG. 6 shows calibration curves of the fluid conductivity sensor system for determining the water void fraction in a fluid mixture flows in accordance with one or more embodiments of the disclosure. The FCS system 100 can be calibrated with static fluids, a calibration curve 600 will be created by filling up the FCS system 100 with distilled water and with waters with different conductivities, this will create a calibration curve that will convert $IS_{12}I$ signal magnitude values into conductivities.

The FCS system 100 further comprises another TLGR in series with the TLGR and structurally identical to the TLGR already described. The TLGRs are separated by a predetermined distance and are configured to determine, using a time delay of a signal waveform between the TLGRs, a flow velocity of the fluid mixture flows. The signal waveform will be similar on first TLGR, x(t), and the second TLGR, y(t−τ), hence the time delay between the two signals can be calculated using the cross-correlation function:

$$r_{xy}(t) = \lim_{T \to \infty} \frac{1}{T} \int_0^T x(t)y(t - \tau)d\tau \tag{5}$$

The flow velocity is calculated by dividing the distance of separation of the TGLRs by the time-delay found with the cross-correlation analysis.

Figure 7:
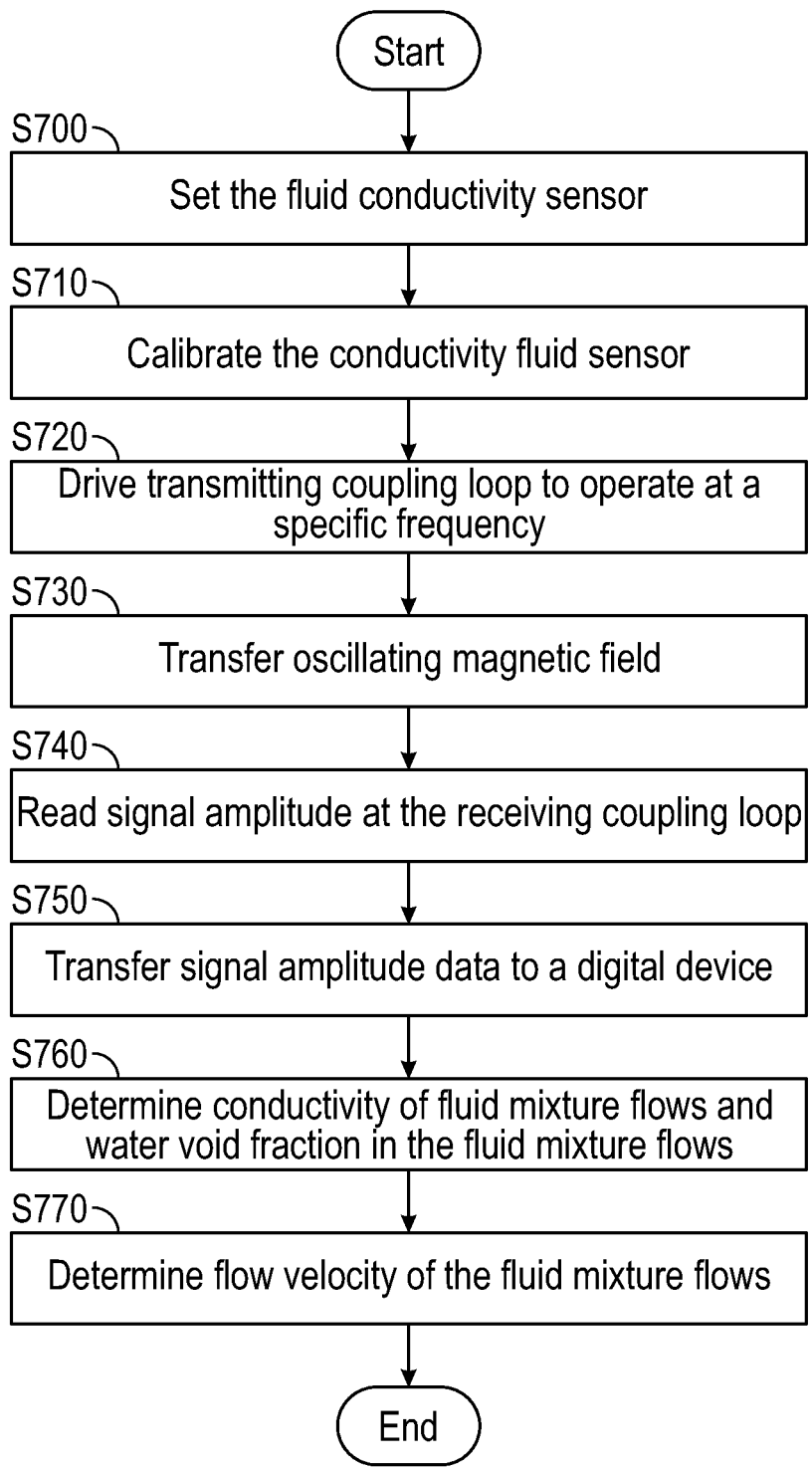
FIG. 7 shows a flowchart of a process for determining the water void fraction in a fluid mixture flows in accordance with one or more embodiments of the disclosure.
Figure 8A:
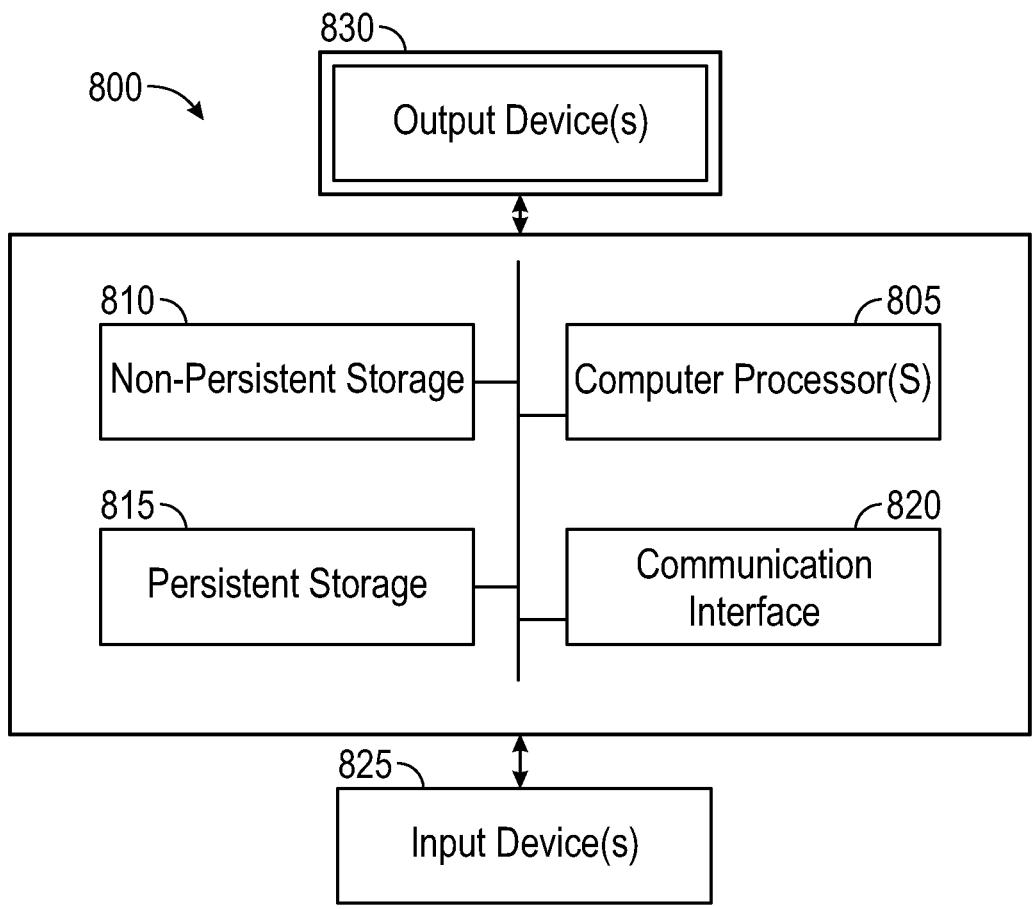
FIG. 8A and FIG. 8B show a computing system in accordance with one or more embodiments of the disclosure.

FIG. 7 shows a flowchart of a process for determining the water void fraction in a fluid mixture flows in accordance with one or more embodiments of the disclosure. The process for determining the water void fraction in the fluid mixture flows may be performed on a computer system, as shown in FIG. 8A.

In step S700, the FCS system 100 is set by filling the duct 130 with the fluid mixture, disposing the first dielectric window 142 into a first surface of a wall of the duct 130, disposing the second dielectric window 144 built-into a second surface of the wall aligned and opposite to the first surface, disposing the first split-TLGR 112 into the first dielectric window 142, disposing the second split-TLGR 116 into the second dielectric window 144, connecting the VNA 120 to the first split-TLGR 142 and the second split-TLGR 116.

In step S710, the FCS system 100 is calibrated. The narrow gap 505 is filled with static fluids and the calibration curve 600 is generated by filling up the narrow gap 505 with distilled water and with waters with different conductivities. By calibrating the FCS system 100 and measuring the inductive power loss versus different reference fluids (i.e., water brine) with different conductivities, it is possible to determine the conductivity of the medium over a fixed distance and oscillating frequency.

In step S720, the VNA 120 drives the first coupling loop 114 located in the first split-TLGR 112, via the first port 124 of the VNA 120, to operate at a specific frequency at which the TLGR resonates. The VNA 120 comprises a first port 124 connected to the first coupling loop 114 located in the first split-TLGR 112 and a second port 128 connected to the second coupling loop 118 located in the second split-TLGR 116.

In step S730, an oscillating magnetic field is transmitted by the first coupling loop 114 located in the first split-TLGR 112. The oscillating magnetic field is transited through the duct 130 via the first dielectric window 142 and the second dielectric window 144 built-into the wall of the duct 130. The oscillating magnetic field is received by the second coupling loop 118 located in the second split-TLGR 116 to form a magnetic loop.

In step S740, the VNA 120 measures, via the second port 128 of the VNA 120 which is connected to the second coupling loop 118 located in the second split-TLGR 116, a signal amplitude related to the conductivity of the fluid mixture flows.

In step S750, the signal amplitude related to the conductivity of the fluid mixture flows which is measured by the VNA 120 is transferred to a digital device for storage and analysis. The IS21I signal magnitude will depend on how conductive the fluid mixture is. The mixture conductivity is related to the water void.

In step S760, the conductivity of the fluid mixture flows and the water void fraction in the fluid mixture fluids is derived from the measured signal amplitude. The fraction of electrically conductive fluid components in the fluid mixture flows determines the strength of the induced magnetic field, and thereby the power dissipation induced which is reflected in the signal read by the second coupling loop 116.

In step S770, the flow velocity of the fluid mixture flows is determined. The FCS system 100 further comprises another TLGR in series with the TLGR and structurally identical to the TLGR. The TLGRs are separated by a predetermined distance and are configured to determine, using a time delay of a signal waveform between the TLGRs, a flow velocity of the fluid mixture flows. The flow velocity is determined by dividing the distance of separation of the TGLRs by the time-delay found with the cross-correlation analysis.

Figure 8B:
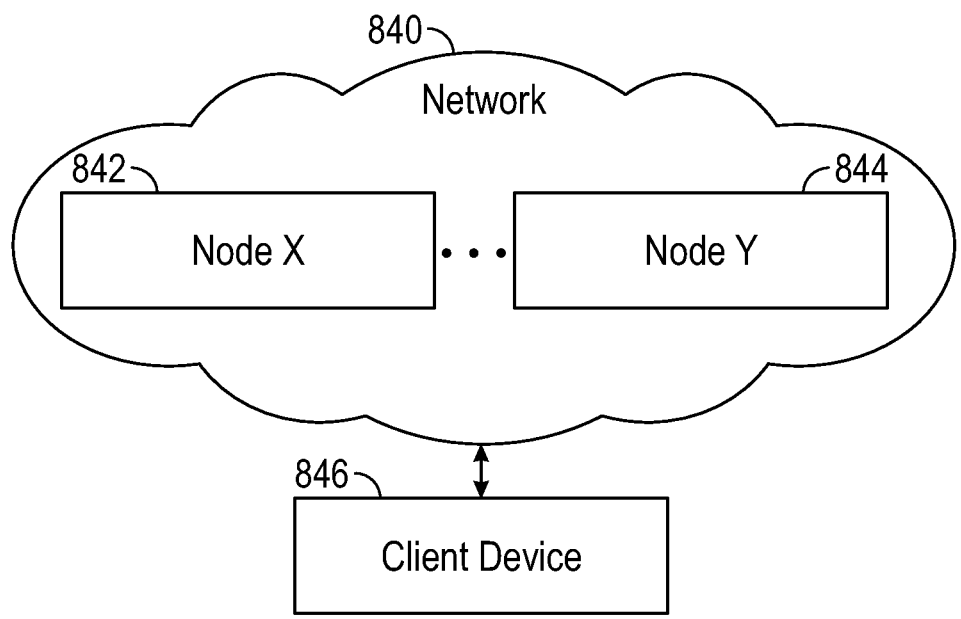

FIG. 8A and FIG. 8B show a computing system in accordance with one or more embodiments of the disclosure. The process for autonomously deploying geophysical cables in the sand dunes area may be performed on a computing system, as shown in FIG. 8A and FIG. 8B. Any combination of mobile, desktop, server, router, switch, embedded device, or other types of hardware may be used. For example, the computing system 800 may include one or more computer processor(s) 805, a non-persistent storage 810 (e.g., volatile memory, such as random access memory (RAM), cache memory), a persistent storage 815 (e.g., a hard disk, an optical drive such as a compact disk (CD) drive or digital versatile disk (DVD) drive, a flash memory, etc.), a communication interface 820 (e.g., Bluetooth interface, infrared interface, network interface, optical interface, etc.), and numerous other elements and functionalities.

The computer processor(s) 805 may be an integrated circuit for processing instructions. For example, the computer processor(s) 805 may be one or more cores or micro-cores of a processor. The computing system 800 may also include one or more input device(s) 825, such as a touch-screen, keyboard, mouse, microphone, touchpad, electronic pen, or any other type of input device.

The communication interface 820 may include an integrated circuit for connecting the computing system 800 to a network (not shown) (e.g., a local area network (LAN), a wide area network (WAN) such as the Internet, mobile network, or any other type of network) and/or to another device, such as another computing device.

The computing system 800 may further includes one or more output device(s) 830, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input device(s) 825 and the output device(s) 830 may be locally or remotely connected to the computer processor(s) 805, the non-persistent storage 810, and the persistent storage 815. Many different types of computing systems exist, and the aforementioned input device(s) 825 and output device(s) 830 may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system 800 in FIG. 8A may be connected to or be a part of a network. For example, as shown in FIG. 8B, the network 840 may include multiple nodes (e.g., node X 842, node Y 844). Each node may correspond to a computing system, such as the computing system shown in FIG. 8A, or a group of nodes combined may correspond to the computing system shown in FIG. 8A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 800 may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 842, node Y 844) in the network 840 may be configured to provide services for a client device 846. For example, the nodes may be part of a cloud computing system. The nodes may include functionality to receive requests from the client device 846 and transmit responses to the client device 846. The client device 846 may be a computing system, such as the computing system shown in FIG. 8A. Further, the client device 846 may include and/or perform all or a portion of one or more embodiments of the disclosure.

The computing system or group of computing systems described in FIGS. 8A and 8B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may be executed on the same or different computing system.

Rather than or in addition to sharing data between processes, the computing system 700 performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor(s) 705. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system 800, in performing one or more embodiments of the disclosure, may extract one or more data items from the obtained data. For example, the extraction may be performed as follows by the computing system 800 in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system 800 of FIG. 8A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system 800 of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system 800 of FIG. 8A and the nodes and/or client device 846 in FIG. 8B. Other functions may be performed using one or more embodiments of the disclosure.

Embodiments of the present disclosure may provide at least one of the following advantages. Embodiments of the disclosure may provide high intrinsic quality factors (Q-factors) without requiring additional shielding due to the toroidal geometry of the FCS system 100 where the magnetic field lines are completely contained within the bore of the resonator with negligible leakage to the outside. Embodiments of the disclosure may offer a stable and compact resonator that is ideally suited for the characterization of the EM properties of liquids and gases. Embodiments of the disclosure make it possible to measure the water void fraction independent of the amount of the other components in the mixture when these are electrically insulating (i.e., oil and gas). Embodiments of the disclosure make it possible to measure large conductivities of fluid mixtures without suffering large signal attenuation while being sensitive only to the water void fraction in the fluid mixture flows. The FCS system 100 may work with two or more resonance frequencies which allow to also measure the water conductivity as well as the overall fluid mixture flows conductivity. The FCS system 100 may operate with flowing media or with static fluids at different pressure conditions, high temperatures, and with hazardous fluids. Flow velocity can be measured by cross-correlation of the power dissipation from the pair of TLGRs in series along pipe.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A fluid conductivity sensor (FCS) system for determining a water void fraction in a fluid mixture flows, the system comprising:
    a duct containing the fluid mixture flows;
    a dielectric window system operatively connected to the duct, wherein the dielectric window system comprises:
        a first dielectric window built-into a first surface of a wall of the duct, and
        a second dielectric window built-into a second surface of the wall aligned and opposite to the first surface;
    a split-toroidal loop-gap resonator (split-TLGR) system operatively connected to the dielectric window system and the duct, wherein the split-TLGR system comprises:
        a first split-TLGR built-into the first dielectric window; and
        a second split-TLGR built-into the second dielectric window; and
    a vector network analyzer (VNA) operatively connected to the split-TLGR system and configured to measure the fluid conductivity, wherein the water void fraction can be derived from the fluid conductivity.

2. The system according to claim 1, wherein the first dielectric window and the second dielectric window are structurally identical.

3. The system according to claim 2, wherein the first split-TLGR and the second split-TLGR are structurally identical.

4. The system according to claim 3, wherein a distal end of the first split-TLGR from the first dielectric window and a distal end of the second split-TLGR from the second dielectric window are joined to form a TLGR.

5. The system according to claim 4, wherein the TLGR comprises:
    a narrow gap filled with a dielectric material;
    first coupling loop located in the first split-TLGR;
    a second coupling loop located in the second split-TLGR; and
    an oscillating magnetic field:
        transmitted by the first coupling loop,
        transited through the duct, via the first dielectric window and the second dielectric window, and
        received by the second coupling loop to form a magnetic loop.

6. The system according to claim 5, wherein the VNA comprises:
    a first port connected to the first coupling loop;
    a second port connected to the second coupling loop.

7. The system according to claim 6, wherein the VNA is configured:
    to drive the first coupling loop, via the first port, to operate at a specific frequency at which the TLGR resonates;
    measure, via the second port, a signal amplitude related to a conductivity of the fluid mixture flows; and
    transfer the signal amplitude to a digital device for storage and analysis.

8. The system according to claim 4, wherein the system further comprises another TLGR in series with the TLGR and structurally identical to the TLGR.

9. The system according to claim 8, wherein the TLGRs are separated by a predetermined distance and are configured to determine, using a time delay of a signal waveform between the TLGRs, a flow velocity of the fluid mixture flows.

10. The system according to claim 7, wherein the system is calibrated with static fluids and configured to create a calibration curve by filling up the gap with distilled water and with waters with different conductivities.

11. A method for determining a water void fraction in a fluid mixture flows, the method comprising:
    filling a duct with the fluid mixture flows;
    disposing a first dielectric window into a first surface of a wall of the duct;
    disposing a second dielectric window built-into a second surface of the wall aligned and opposite to the first surface;
    disposing a first split-TLGR into the first dielectric window;
    disposing a second split-TLGR into the second dielectric window;
    connecting a vector network analyzer (VNA) to the first split-TLGR and the second split-TLGR;
    measuring a fluid conductivity using the VNA; and
    deriving the water void fraction from the fluid conductivity.

12. The method according to claim 11, wherein the first dielectric window and the second dielectric window are structurally identical.

13. The method according to claim 12, wherein the first split-TLGR and the second split-TLGR are structurally identical.

14. The method according to claim 13, wherein the method further comprises joining a distal end of the first split-TLGR from the first dielectric window and a distal end of the second split-TLGR from the second dielectric window to form a TLGR.

15. The method according to claim 14, wherein the TLGR comprises a narrow gap filled with a dielectric material, first coupling loop located in the first split-TLGR, a second coupling loop located in the second split-TLGR, and an oscillating magnetic field, wherein the method further comprises:
    transmitting the oscillating magnetic field using the first coupling loop;
    transiting the oscillating magnetic field through the duct via the first dielectric window and the second dielectric window; and
    receiving the oscillating magnetic field by the second coupling loop to form a magnetic loop.

16. The method according to claim 15, wherein the method further comprises:
    connecting a first port of the VNA with the first coupling loop; and
    connecting a second port of the VNA with the second coupling loop.

17. The method according to claim 16, wherein the method further comprises:
- driving the first coupling loop, using the VNA via the first port, to operate at a specific frequency at which the TLGR resonates;
- measuring, using the VNA via the second port, a signal amplitude related to a conductivity of the fluid mixture flows; and
- transferring the signal amplitude, using the VNA, to a digital device for storage and analysis.

18. The method according to claim 14, wherein the method further comprises putting in series another TLGR structurally identical to the TLGR with the TLGR.

19. The method according to claim 18, wherein the method further comprises separating the TLGRs by a predetermined distance and determining, using a time delay of a signal waveform between the TLGRs, a flow velocity of the fluid mixture flows.

20. The method according to claim 17, wherein the method further comprises filling up the gap with static fluids and creating a calibration curve by filling up the gap with distilled water and with waters with different conductivities.

\* \* \* \* \*